United States Patent [19]

May et al.

[11] 4,183,970

[45] Jan. 15, 1980

[54] PREPARATION OF A FLAVOR EXTENDER FROM WHEY

[75] Inventors: William A. May, Morristown, N.J.; Ivan R. Fernandez, Brooklyn, N.Y.; Patrick P. Donohue, Old Bridge; Alphonse J. DiCara, Randolph Township, Morris County, all of N.J.

[73] Assignee: Fritzche Dodge & Olcott Inc., New York, N.Y.

[21] Appl. No.: 839,208

[22] Filed: Oct. 4, 1977

[51] Int. Cl.² .................. A23C 21/00; A23G 1/00; A23F 1/14
[52] U.S. Cl. ................... 426/583; 426/584; 426/593; 426/596; 426/650; 426/466; 426/471
[58] Field of Search .......... 426/583, 650, 471, 466, 426/584, 593, 594, 596, 660

[56] References Cited

U.S. PATENT DOCUMENTS 3,677,771   7/1972   Kolar Jr. .................... 426/660 X

OTHER PUBLICATIONS

Webb, et, al., Byproducts from Milk, 2nd Ed., The Ari Publ., Co., Inc., Westport, Conn. 1970 (pp. 294–303).
Lees, R., Manufacture of Caramel, Food Manufacture, Mar. 1973 (pp. 45–46 and 50).

*Primary Examiner*—David M. Naff
*Attorney, Agent, or Firm*—Cooper, Dunham, Clark, Griffin & Moran

[57] ABSTRACT

A material useful as a flavor extender is produced by pressure-cooking whey solids, such as spray dried sweet cheese whey, in the presence of liquid water at a temperature in the range about 110°–200° C. for up to about 30–60 minutes, followed by cooling and drying the resulting pressure-cooked whey solids. The resulting processed or pressure-cooked whey material is useful alone or in compositions as a flavor material or as a flavor extender. Food or flavor compositions can be flavored and/or their flavor extended by incorporating therein the processed whey solids material or compositions containing the same. Two particularly important embodiments of this invention are the use of the processed whey solids material or compositions containing the same as extenders for cocoa or coffee.

23 Claims, No Drawings

PREPARATION OF A FLAVOR EXTENDER FROM WHEY

BACKGROUND OF THE INVENTION

There has been considerable work performed relating to substances which can be used to impart or enhance or extend flavors of food products, especially those containing cocoa. These substances serve to reduce the need for or use of basic or raw natural materials, such as cocoa, which may be in short supply and costly, and to provide more uniform properties in the finished product.

The production of flavor derived from cocoa for use in the manufacture of chocolate and cocoa products involves numerous separate and distinct steps commencing at plantations in tropical environments and continuing until incorporation of the flavor in a finished product, such as confectionary, beverages, baked goods, puddings, compound coatings, etc. The well-known processes for producing cocoa include fermentation, drying, grading, and roasting. During processing, several chemical reactions take place which ultimately produce the characteristic flavor of cocoa. These processes require the use of expensive, sometimes not readily available, raw material and ultimately increase the cost of the finished product.

The prior art has recognized as cocoa extenders and/or replacements chocolate flavors encapsulated in Carob starch, dextrose, gums, etc. The cocoa extender and/or replacement of this invention differs from the prior art in that it involves the combination of chemicals used for flavor compounding with inexpensive raw material high in specific carbohydrates and protein, namely, processed whey solids.

Flavor extenders have previously been prepared by methods involving evaporation of liquid milk-whey, U.S. Pat. No. 442,593; drying of yeast fermented whey, U.S. Pat. No. 3,720,519; fractionation of partially delactosed liquid cheese whey, U.S. Pat. No. 3,930,056; and low temperature evaporation of liquid whey, U.S. Pat. No. 1,763,633. The subject invention concerns a method comprising high temperature processing of whey solids in the presence of liquid water and under pressure to produce a product possessing, astringency, bitterness and appearance and which can be used in combination with or in place of cocoa and other flavor material, natural or synthetic, to enhance, modify, improve and standardize the natural flavor of cocoa when applied to food systems.

BRIEF SUMMARY OF THE INVENTION

Specifically, the present invention provides a method of producing a material useful as a flavor extender from a mixture of whey solids and water by heating the mixture under pressure, then cooling and drying the pressure-cooked mixture. The invention also relates to the material prepared in accordance with this method, the use of this material in producing compositions useful as flavor extenders or flavoring agents and the compositions so produced. Finally, this invention provides a method of flavoring food compositions or comestibles by incorporating in food products or comestibles, including beverages, e.g. soft drinks, milk beverages and alcoholic drinks, the processed whey solids material or compositions containing the same together with an added flavoring agent.

DETAILED DESCRIPTION OF THE INVENTION

Whey solids having the following compositions are useful in the practices of this invention:

| Component | Approx. % Wt. |
| --- | --- |
| Lactose | 64–75 |
| Protein | 8–16 |
| Fat | 0.5–2.0 |
| Lactic Acid | 1.5–4.5 |
| Calcium | 0.1–2.5 |
| Phosphorus | 0.1–1.5 |
| Sodium | 0.1–1.5 |
| Moisture | 3.0–6.0 |

Generally, whey solids, and particularly animal feed grade whey solids, are usefully employed in the preparation of the processed whey materials useful as flavor material or flavor extenders.

In accordance with this invention, whey solids and water are mixed to provide an aqueous admixture, such as an admixture containing a major amount >50% whey solids and a minor amount <50% water, such as a mixture having the following relative amounts: water about 10–20%, e.g. 12–19%, and whey solids about 80–90%, e.g. 81–88%. The mixture comprising whey solids and water is then processed at a high temperature such that the lactose begins to caramelize and the proteins to degrade so as to form bitterness artifacts. This processing step can be accomplished in a number of ways. The presently preferred technique is to subject the mixture to an elevated temperature and pressure, preferably with agitation, in a steam jacketed vessel or other vessel suitable for pressure cooking. The heating or pressure cooking is carried out at a temperature from above 100° C., e.g. 110° C., to about 200° C., more or less, e.g. 160° C., and at a pressure from about 10 pounds per square inch to about 200 pounds per square inch sufficient to maintain water in the mixture being cooked in the liquid phase, for at least about 5–10 minutes. For best results for the production of processed whey solids useful as a cocoa extender, the mixture is processed at a temperature from about 120° C. to about 135° C. and at a pressure from about 35 pounds per square inch to about 50 pounds per square inch for a period of time up to about or at least one hour.

After the mixture has been so heated, it is cooled to a temperature below 100° C. and then dried, in the presence of a minor amount of an added flavor supplement, if desired, to produce a processed whey solids material useful as a flavor extender. The drying operation can be particularly effectively carried out by spray drying using conventional spray drying equipment in which the material to be dried is atomized in contact with a drying gas. Suitable spray drying conditions may involve an inlet temperature of about 250° C. for the drying gas, an outlet temperature of about 100° C. The resulting dried material can then be used as a flavor extender or flavoring agent in food products.

The above described spray drying operation would appear to be particularly suitable for use in a commercial operation for the production of dry, processed whey solids useful as a flavor material or flavor extender in accordance with this invention. Other drying operations or techniques, however, are usefully and conveniently employed. For example, the processed whey solids, immediately after having been pressure cooked, can be discharged or dropped from the cooking vessel under conditions such that water vapor is flashed therefrom and the resulting processed whey solids at atmospheric pressure are substantially cooled and dried at the same time, i.e., to a moisture content below about 10% by weight, substantially lower than the moisture or water content of the whey solids being cooked.

The atmospherically flashed processed whey solids could be distributed on a suitable surface for drying and/or cooling thereon. In one special embodiment of this invention, the cooked, discharged whey solids could be applied onto or admixed with a suitable substrate material, such as exhausted cocoa, which would absorb moisture from the cooked processed whey solids so that the resulting admixture of processed whey solids and substrate material would have a low water content below about 5% by weight, such as in the range 0.5-2.5% by weight moisture. In this special embodiment for the drying of the cooked processed whey solids, it is preferred to employ particle-form substrate material, especially particle-form edible or consumable substrate material. This aspect or embodiment of the invention would be advantageously employed in connection with the use of the processed whey solids as a cocoa extender. In this instance or embodiment, the processed whey solids would be applied for cooling and drying directly onto cocoa by-products or exhausted cocoa or cocoa and the resulting admixture thoroughly intermingled or mixed to produce a cocoa product having the processed whey solids material present therein as an extender as well as contributing its own flavor. A similar type operation would also be applicable to the production of a coffee product with the processed whey solids material present therein as a coffee extender and also for the production of a malt-containing composition or caramel-containing composition with the processed whey solids material present therein as a malt flavor or caramel flavor extender.

Another technique for the handling and drying of the processed whey solids which is generally useful, particularly for the preparation of a flavor composition, is as follows. After the processed whey solids have been cooled and substantially dried, such as to a moisture content below 10% by weight, water is added to the processed whey solids, and, if desired, a flavor material, such as a liquid or solid flavor material, e.g. cocoa or coffee, added thereto. In this instance, the resulting composition containing processed whey solids and water and, if desired, a flavor material, such as cocoa or coffee, would contain a major amount of water. The resulting admixture, after mixing to produce a homogeneous dispersion, would be spray dried or otherwise suitably dried to produce a product which, in the absence of any flavor material, such as cocoa or coffee, would be useful per se as a flavor extender or, when cocoa or coffee or other flavoring material is present or added to the spray dried product, would contain the processed whey solids in a major or minor amount as a flavor extender.

Compositions useful as flavor extenders can be produced from the processed whey solids material of this invention, including, if desired, a flavor supplement and water. As indicated hereinbelow, compositions useful as cocoa extenders and/or replacements can be produced from admixtures in which the flavor supplement has been dutched to provide the necessary top notes and milk chocolate character which in combination with the bitterness, astringency, and caramelized notes of the processed whey solids material provide a total flavor which can be used as a cocoa extender and/or replacement very economically in several food products. Useful such admixtures are comprised of about 67% by weight processed whey solids material, about 1-8% by weight flavor supplement, e.g. liquid chocolate top note flavor, and 18-25% by weight modified starch together with a color additive to desired specification.

Such admixtures are blended until they are of substantially homogeneous consistency and are then dried to produce compositions useful as flavor extenders or flavoring agents.

While the processed whey materials and compositions of the subject invention are particularly useful in the manufacture of cocoa extenders and/or replacements, these materials can be used in the manufacture of and employed in a number of flavors and flavor extenders, such as for the flavors coffee, malt, caramel, etc., which usually require the presence of large amounts of protein and carbohydrates as are provided by whey solids.

A cocoa extender and/or replacement product produced in accordance with this invention, and including processed whey solids as described, would be a powdery product quite similar in appearance to natural cocoa which is soluble in aqueous media, such as water, milk and the like. The product is capable of being used as a substitute for natural cocoa or an extender of natural cocoa and could be incorporated into a wide variety of products, such as confectionary products, dairy products, and bakery goods. It could also be combined with fats, such as cocoa butter, or various hydrogenated or fractionated vegetable oils to provide an artificial chocolate or artificial chocolate coating.

Other methods of producing a free flowing powder reminiscent of natural cocoa, and including processed whey solids as described herein, include freeze drying, foam mat drying, drum drying, and an extended product mixture, such as a composition comprising a flavor supplement in an amount of about 3-10%, e.g. 4.8% by weight, processed whey solids material in an amount of about 20-60%, e.g. 57.8% by weight, and dried cocoa slurry in an amount of about 20-60%, e.g. 37.4% by weight. This composition is blended to produce a uniform, free flowing powder at room temperature.

In accordance with the subject invention, food compositions can be flavored or their flavors can be extended by incorporating in food products the processed whey solids material or the compositions prepared in accordance with this invention. The following are examples given to illustrate embodiments of the invention as it is presently preferred to practice. It will be understood that these examples are merely illustrative, and the invention is not to be considered restricted thereto.

EXAMPLE I

Baked Products, Puddings and Beverages

The following mixture is prepared:

| Component | % by Wt. |
| --- | --- |
| Processed Whey Solids | 67.0 |
| Flavor Supplement (liquid chocolate top note flavor) | 8.0 |
| Modified Starch | 25.0 |

The above mixture is then spray dried and can be used to replace 50–75% of natural cocoa used in all types of baked food products on a pound-for-pound basis or to replace 40–60% of natural cocoa used in cooked chocolate pudding on a pound-for-pound basis. This same mixture can be used to replace 60–75% natural cocoa in instant chocolate puddings on a pound-for-pound basis and to replace 65–75% of natural cocoa used in instant and processed milk beverage mixes as indicated hereinbelow:

| Ingredients | % (100% Cocoa) | % (75% Replacement) |
|---|---|---|
| Sugar | 78.95 | 78.95 |
| Cocoa Powder | 19.90 | 4.98 |
| Calcium Carrageenan | 0.60 | 0.60 |
| Salt | 0.34 | 0.34 |
| Vanillin | 0.20 | 0.20 |
| Ground Cinnamon | 0.01 | 0.01 |
| Processed Whey Solids as Cocoa Extender | — | 14.92 |
| | 100.00 | 100.00 |

These instant beverage mixes can be used at a ratio of 19.40 grams to 240 grams of warm or cold milk.

Mixtures useful as a frosting and containing 67.0% by weight processed whey solids, 8.0% by weight flavor supplement and 25% by weight water are prepared. These mixtures when spray dried can be used to replace 60–80% of the natural cocoa used in the preparation of chocolate frostings on a pound-for-pound basis.

Similarly, compound coatings containing 67.0% by weight processed whey solids, 8.0% by weight flavor supplement and 25.0% by weight water are prepared. These mixtures when spray dried can be used to replace 50–75% of the natural cocoa used in the preparation of compound coatings and/or artificial chocolates.

The processed whey solids of this invention are also useful in the tobacco industry, such as in the preparation or make-up of casing sauce used in the preparation of smoking tobacco from or in the treatment of burley tobacco. The processed whey solids, particularly cocoa flavored processed whey solids, can be employed in the make-up of casing sauce to replace up to about 40–60% by weight, more or less, of other components therein, such as cocoa.

As will be apparent to those skilled in the art in the light of the foregoing disclosure many modifications, alterations and substitutions are possible in the practices of this invention without departing from the spirit or scope thereof.

We claim:

1. A method of producing a material useful as a flavor extender which comprises heating an admixture consisting essentially of a major amount of whey solids and a minor amount of liquid water at a temperature above 100° to about 200° C. and at a pressure of from about 10 to 200 pounds per square inch sufficient to maintain water in the admixture undergoing heating in the liquid phase for a period of time of at least five minutes, and cooling the resulting admixture to a temperature below 100° C. to produce a processed whey solids material useful as a flavor extender.

2. A method in accordance with claim 1 wherein the resulting heated admixture of whey solids and liquid water is dried to a moisture content below about 10% by weight.

3. A method in accordance with claim 1 wherein said admixture comprises from about 10 to about 20 percent by weight of water and from about 90 to 80 percent by weight whey solids.

4. A method in accordance with claim 1 wherein the resulting heated admixture of whey solids and liquid water, after cooling, is dried by adding water to the cooled admixture to form a mixture comprising a major amount by weight of water, distributing the processed whey solids uniformly or homogeneously within said mixture and dispersing the resulting mixture into contact with a stream of hot air to effect drying of the mixture.

5. A method in accordance with claim 4 wherein the mixture is dried to a moisture content below about 10% by weight.

6. A method in accordance with claim 1 wherein the resulting cooled admixture is applied or uniformly mixed with a substantially dry substrate material.

7. A method in accordance with claim 6 wherein said substrate material is edible or capable of human consumption.

8. A method in accordance with claim 1 which further comprises adding a flavoring agent to said cooled admixture and drying the resulting mixture.

9. A method in accordance with claim 1 which further comprises adding a flavoring agent and a major amount of water to said cooled admixture and spray drying the resulting mixture.

10. A method in accordance with claim 9 wherein said flavoring agent is chocolate-flavored material.

11. A method in accordance with claim 9 wherein said flavoring agent is cocoa.

12. A method in accordance with claim 9 wherein said flavoring agent is coffee-flavored material.

13. A method in accordance with claim 9 wherein said flavoring agent is coffee.

14. A method in accordance with claim 9 wherein said flavoring agent is malt-flavored material.

15. A method in accordance with claim 9 wherein said flavoring agent is malt.

16. A method in accordance with claim 1 wherein the heating of said admixture is carried out while agitating or mixing said admixture.

17. Processed whey solids material in accordance with claim 1.

18. A comestible comprising an edible food or beverage product and a flavor-extending amount of the processed whey solids material in accordance with claim 1.

19. A cocoa composition comprising cocoa and processed whey solids material in accordance with claim 1.

20. A coffee composition comprising coffee and processed whey solids material in accordance with claim 1.

21. A malt composition comprising malt and processed whey solids material in accordance with claim 1.

22. A method of extending the flavor of a food or beverage composition which comprises adding to said food or beverage composition a flavor-extending amount of processed whey solids material in accordance with claim 1.

23. The method of claim 22 wherein said flavor-extending amount of processed whey solids is an amount in the range 1–25% by weight based on said composition.

* * * * *

UNITED STATES PATENT AND TRADEMARK OFFICE
CERTIFICATE OF CORRECTION

PATENT NO. : 4,183,970

DATED : January 15, 1980

INVENTOR(S) : William A. May, Ivan R. Fernandez, Patrick P. Donohue and Alphonse J. DiCara It is certified that error appears in the above-identified patent and that said Letters Patent are hereby corrected as shown below:

Column 1, line 61, "or flavoring agents" should be deleted.

Signed and Sealed this

Eighth Day of July 1980

[SEAL]

Attest:

SIDNEY A. DIAMOND

Attesting Officer

Commissioner of Patents and Trademarks